(12) United States Patent  
Thylen et al.

(10) Patent No.: US 8,948,554 B2  
(45) Date of Patent: Feb. 3, 2015

(54) SLOT-LINE WAVEGUIDE OPTICAL SWITCH SYSTEM AND METHOD

(75) Inventors: Lars Helge Thylen, Huddinge (SE); Michael Renne Ty Tan, Menlo Park, CA (US); Alexandre M Bratkovski, Mountain View, CA (US); Shih-Yuan Wang, Palo Alto, CA (US); Wayne V. Sorin, Mountain View, CA (US); Michael Josef Stuke, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 393 days.

(21) Appl. No.: 13/269,659

(22) Filed: Oct. 10, 2011

(65) Prior Publication Data

US 2013/0089288 A1  Apr. 11, 2013

(51) Int. Cl.
| | |
|---|---|
| *G02B 6/26* | (2006.01) |
| *G02B 6/42* | (2006.01) |
| *G02F 1/313* | (2006.01) |
| *G02B 6/35* | (2006.01) |

(52) U.S. Cl.
CPC .............. *G02F 1/313* (2013.01); *G02B 6/3596* (2013.01); *G02F 1/3137* (2013.01)
USPC .............................................. 385/45; 385/18

(58) Field of Classification Search
USPC ..................................................... 385/18, 45
See application file for complete search history.

(56) References Cited

U.S. PATENT DOCUMENTS

| | | | |
|---|---|---|---|
| 6,167,169 A * | 12/2000 | Brinkman et al. ................. | 385/4 |
| 6,222,966 B1 * | 4/2001 | Khan et al. ...................... | 385/45 |
| 6,618,518 B1 * | 9/2003 | Mahadevan et al. ............ | 385/18 |
| 7,373,063 B2 | 5/2008 | Nakata et al. | |
| 7,519,257 B2 | 4/2009 | Lipson et al. | |
| 7,639,913 B2 | 12/2009 | Nakamura et al. | |
| 2004/0096144 A1 * | 5/2004 | Ramalingam et al. .......... | 385/16 |
| 2008/0099698 A1 * | 5/2008 | Rahman et al. ............ | 250/493.1 |
| 2008/0223821 A1 | 9/2008 | Jordana et al. | |
| 2010/0021124 A1 | 1/2010 | Koos et al. | |
| 2010/0096562 A1 | 4/2010 | Klunder et al. | |
| 2010/0111470 A1 | 5/2010 | Assefa et al. | |

* cited by examiner

*Primary Examiner* — Jerry Blevins
(74) *Attorney, Agent, or Firm* — Tarolli, Sundheim, Covell & Tummino

(57) ABSTRACT

A slot-line waveguide optical switch system and method are disclosed. An optical switch system can include a slot-line waveguide optical switch that includes a plurality of wall portions that are each formed from a high refractive-index material and that are arranged to form a channel portion comprising an electro-optic material interposed to extend between the plurality of wall portions. The channel portion can include an input channel to receive an input optical signal and plural output channels to receive the input optical signal from the input channel. A channel switching system can provide a voltage to an electrode coupled to a corresponding wall portion to change a relative refractive index in the output channels via the electro-optic material and thereby switch the input optical signal to one of the output channels.

11 Claims, 6 Drawing Sheets

US 8,948,554 B2

SLOT-LINE WAVEGUIDE OPTICAL SWITCH SYSTEM AND METHOD

BACKGROUND

Optical systems are becoming more prevalent in modern communications systems as the demand for high-speed and high-efficiency communications increases. Many optical systems employ waveguides to direct optical signals to optical processing devices. An example of a waveguide includes a slot-line waveguide that operates to guide strongly confined light in a subwavelength-scale low refractive index region surrounded by high refractive index materials to guide the optical signal. Optical systems can be controlled based on optical switching, which can be required to occur at very fast rates and in very small form-factors based on increasing consumer demands.

DETAILED DESCRIPTION

Figure 1:
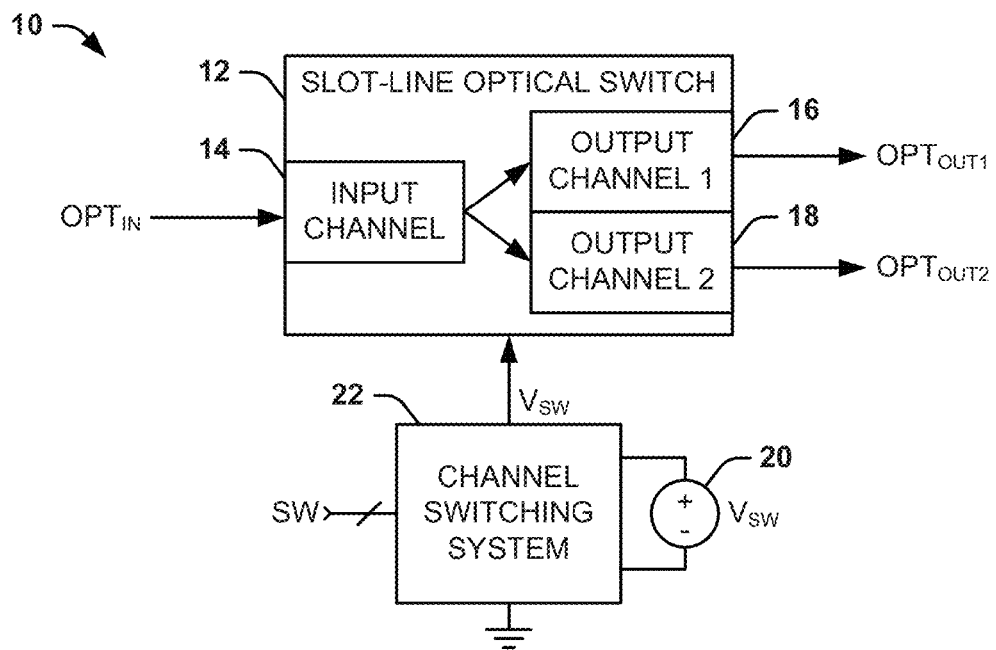
FIG. 1 illustrates an example of an optical switch system.

FIG. 1 illustrates an example of an optical switch system 10. The optical switch system 10 can be implemented in any of a variety of optical communications environments to selectively switch an input optical signal $OPT_{IN}$ to a first output as a first output optical signal $OPT_{OUT1}$ and a second output optical signal $OPT_{OUT2}$. The optical switch system 10 includes a slot-line optical switch 12. The slot-line optical switch 12 can be configured as comprising a combination optical switch and slot-line waveguide, such that the slot-line optical switch 12 includes a plurality of high refractive index wall portions that are arranged to form a channel portion therebetween. The plurality of wall portions and channel portions can thus define an input channel 14, a first output channel 16, and a second output channel 18 for the slot-line optical switch 12. The input optical signal $OPT_{IN}$ can be switched from the input channel 14 to one of the first and second output channels 16 and 18 based on the electro-optic effect of the electro-optic material in the channel portion of the slot-line optical switch 12. As an example, the channel portion can be formed from an electro-optic material. As described herein, the electro-optic material is defined as a material that possesses an electro-optic effect, such as any material that exhibits a change in the optical properties of the material in response to an electric field. Thus, the term "electro-optic material" can be used herein to describe electro-optic polymers, chalcogenides, or any of a variety of other materials that exhibit such an electro-optic effect.

Figure 2:
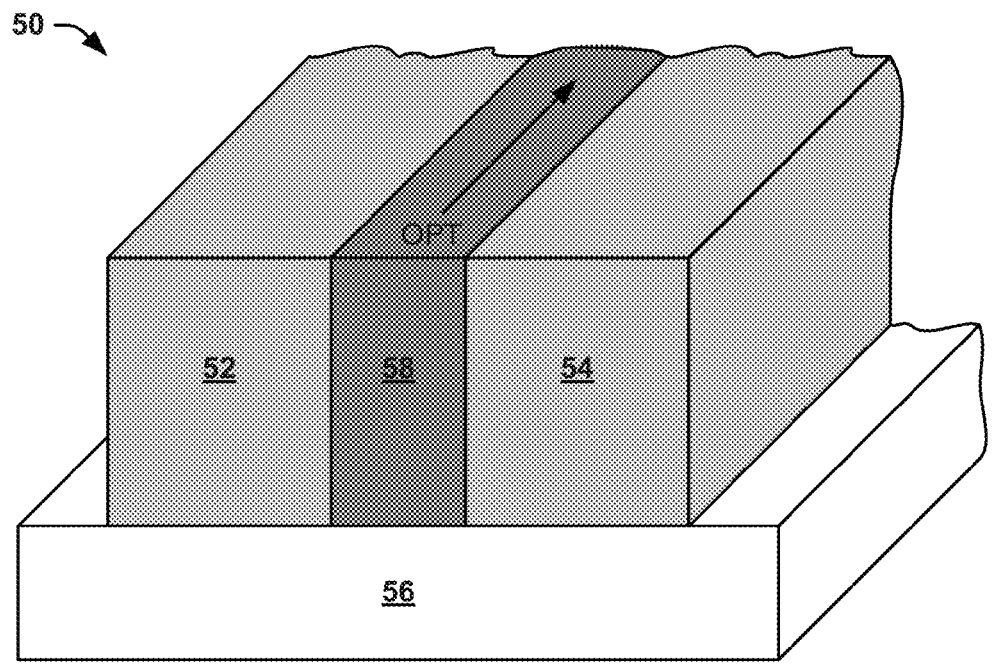
FIG. 2 is an isometric view illustrating an example of a slot-line waveguide.

FIG. 2 illustrates a schematic example of part of a slot-line waveguide 50. As an example, the slot-line waveguide 50 can correspond to the slot-line waveguide that forms the input channel 14 and the output channels 16 and 18 of the slot-line optical switch 12 of FIG. 1. The slot-line waveguide 50 includes a first wall portion 52 and a second wall portion 54. The first and second wall portions 52 and 54 can be formed from high refractive-index materials, such as silicon (Si). In the example of FIG. 2, the first and second wall portions 52 and 54 are demonstrated as being formed on a substrate 56. As an example, the substrate 56 can be a dielectric material, such as silica ($SiO_2$). The first and second wall portions 52 and 54 are spaced apart by a lower refractive index elongated channel portion 58 that extends parallel to the wall portions.

The channel portion 58 is configured to guide an optical signal OPT, which can be one of the input optical signal $OPT_{IN}$, the first output optical signal $OPT_{OUT1}$, or the second output optical signal $OPT_{OUT2}$. The channel portion 58 can include an electro-optic material that is subject to the electro-optic effect. For example, the material in the channel portion 58 can be implemented as a chalcogenide, such that an applied electric field switches the material phase of the chalcogenide material between an amorphous and a crystalline state. As another example, the material in the channel portion 58 can be implemented as a high-electro-optic polymer, such as having an electro-optic coefficient $r_{33}$ greater than 300 pm/V. The combination of high-electro-optic effect and narrow slot further helps to reduce the so called voltage times length product. The resulting optical switch can thus operate with a digital-like response, as opposed to other typical optical switches. In addition, the resulting optical switch can be implemented to require a single voltage for operation, in contrast to many existing switch designs that require different voltages for different switches due to a quasi-periodic response with respect to applied voltage. It is to be understood that, while the channel portion 58 and wall portions 52 and 54 are demonstrated in a rectangular slot-line cross-sectional shape, other shapes can be implemented for the waveguide structure.

Referring back to the example of FIG. 1, the slot-line optical switch 12 can include one or more electrodes coupled to one or more of the wall portions that define the input channel 14, the first output channel 16, and/or the second output channel 18. The one or more electrodes can be configured to receive a switching voltage $V_{SW}$, demonstrated in the example of FIG. 1 as being generated from a voltage source 20, to provide the switching of the input optical signal $OPT_{IN}$ to one of the first and second output channels 16 and 18 to be provided as the respective one of the first and second output optical signals $OPT_{OUT1}$ and $OPT_{OUT2}$. As an example, the switching voltage $V_{SW}$ can be provided at a first polarity to switch the input optical signal $OPT_{IN}$ to the first output channel 16 to be provided as the first output optical signal $OPT_{OUT1}$ and at a second polarity to switch the input optical signal $OPT_{IN}$ to the second output channel 18 to be provided as the second output optical signal $OPT_{OUT2}$.

In the example of FIG. 1, the switching of the input optical signal $OPT_{IN}$ between the first and second output channels 16 and 18 is provided based on one or more switching signals SW being provided to a channel switching system 22. As an example, the channel switching system 22 can be implemented based on the one or more switching signals SW to provide the switching voltage $V_{SW}$ at one of opposite polarities to provide the switching of the slot-line optical switch 12.

For example, in the example of the use of an electro-optic polymer, the electro-optic material in at least the first and second output channels 16 and 18 can be poled to break the inversion symmetry of the material, thus providing the electro-optic effect of the electro-optic material in each of the first and second output channels 16 and 18. As a result, application of the opposite polarities of the switching voltage $V_{SW}$ can change the relative electric field, and thus the relative refractive index, in the first and second output channels 16 and 18. Therefore, as an example, the slot-line optical switch 12 can correspond to a digital optical switch that has a first switching state based on application of a positive switching voltage $+V_{SW}$ and a second switching state based on application of a negative switching voltage $-V_{SW}$.

Figure 3:
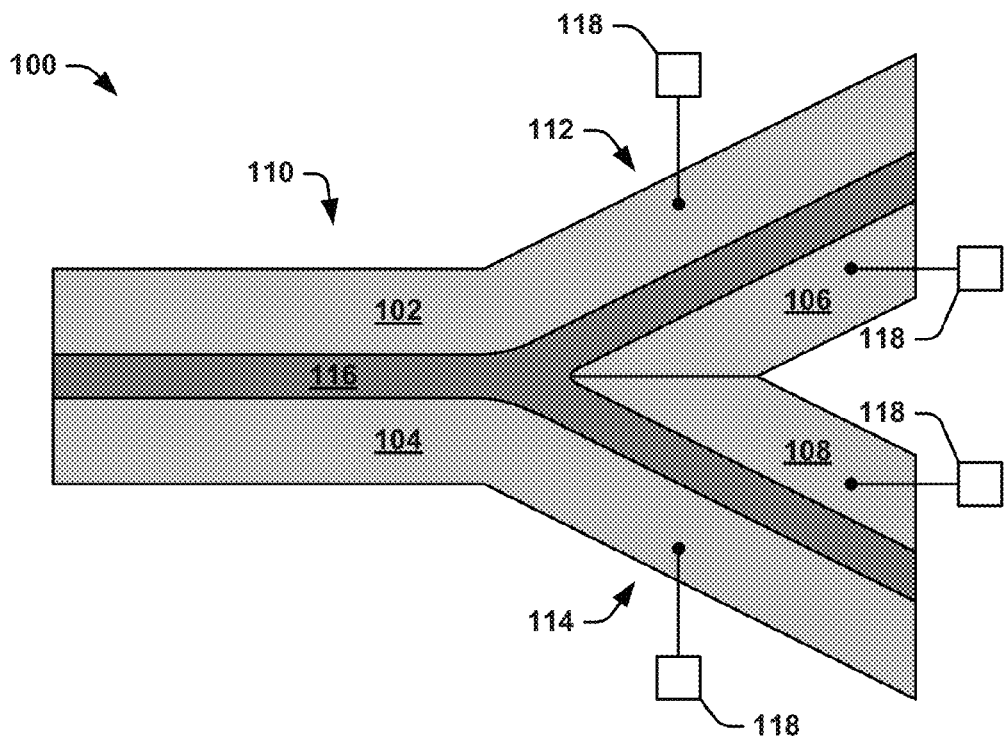
FIG. 3 illustrates an example of a slot-line optical switch.

FIG. 3 illustrates an example of a slot-line optical switch 100. The slot-line optical switch 100 can correspond to the slot-line optical switch 12 in the example of FIG. 1. The slot-line optical switch 100 is demonstrated in the example of FIG. 3 in an overhead view, such that the slot-line optical switch 100 can be constructed in the manner demonstrated in the example of FIG. 2. The slot-line optical switch 100 includes a first wall portion 102, a second wall portion 104, a third wall portion 106, and a fourth wall portion 108, which can each be formed from a high refractive-index material, such as described above in the example of FIG. 2. The wall portions 102, 104, 106, and 108 can each be electrically insulated with respect to each other. The first and second wall portions 102 and 104 can define a slot-line waveguide input channel 110, the first and third wall portions 102 and 106 can define a first slot-line waveguide output channel 112, and the second and fourth wall portions 104 and 108 can define a second slot-line waveguide output channel 114. The input channel 110 and the first and second output channels 112 and 114 can include an electro-optic material 116, such as described above in the example of FIG. 2.

The slot-line optical switch 100 also includes electrodes 118 that are coupled to each of the respective wall portions 102, 104, 106, and 108. As an example, the electrodes 118 could be conductive metals that are coupled to the wall portions 102, 104, 106, and 108, or the electrodes 118 could be part of and/or integral with the wall portions 102, 104, 106, and 108 themselves, such as formed from silicon. The electrodes 118 can be configured to receive one or more poling voltages, such as subsequent to fabrication of the slot-line optical switch 100, to pole the electro-optic material 116 in at least the first and second output channels 112 and 114. Thus, an electric field can be generated in the electro-optic material 116, thus providing the material 116 with a high electro-optic effect (e.g., having an electro-optic coefficient $r_{33}$ greater than 300 pm/V). In addition, one or more of the electrodes 118 can be configured to receive the switching voltage $V_{SW}$ during operation of the slot-line optical switch 100 to switch an input optical signal $OPT_{IN}$ between the first and second output channels 112 and 114. Thus the respective electrodes can provide dual purposes, namely, poling the structure to create the desired electro-optic effect as well as provide switching signals for operating the optical switch.

Figure 4:
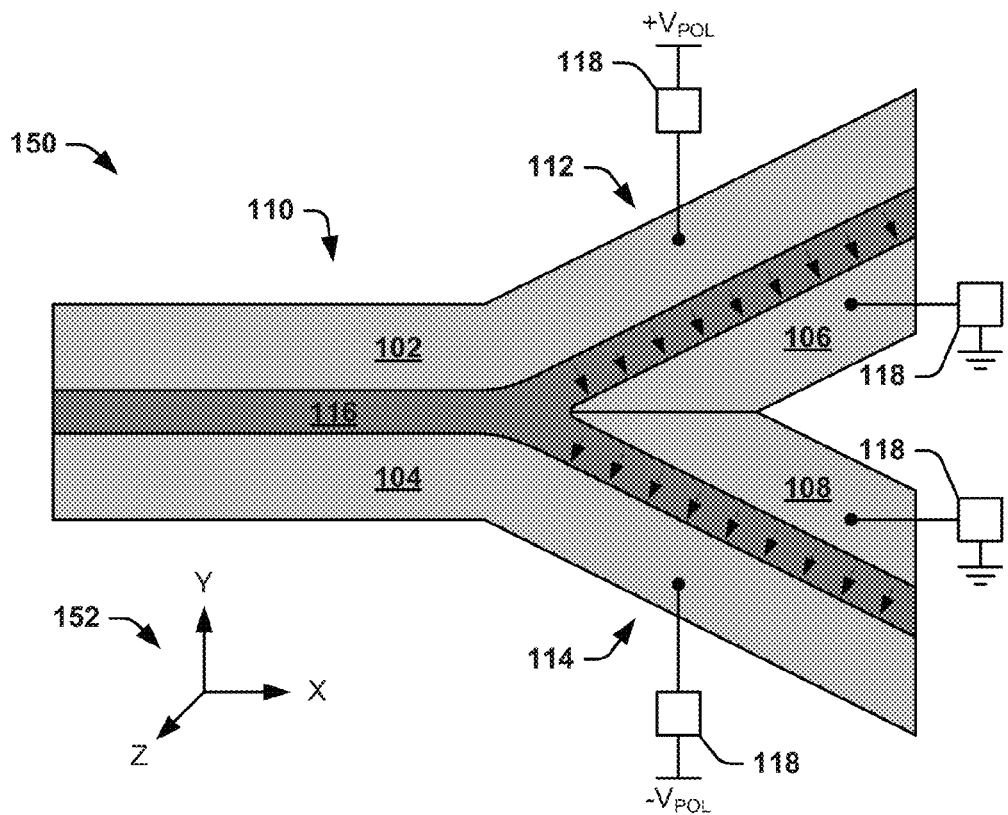
FIG. 4 illustrates an example diagram demonstrating poling of a slot-line optical switch.

FIG. 4 illustrates an example diagram 150 of poling of the slot-line optical switch 100. As an example, the poling of the slot-line optical switch 100 can be performed after fabrication of the slot-line optical switch 100, for example, for an electro-optic material 116 that is formed from an organic polymer material. Alternatively, for an electro-optic material 116 that is formed from a chalcogenide material, the poling step demonstrated in the example of FIG. 4 can be omitted.

The diagram 150 demonstrates application of a first poling voltage $+V_{POL}$ to the electrode 118 coupled to the first wall portion 102 and application of a second poling voltage $-V_{POL}$ to the electrode 118 coupled to the second wall portion 104. In addition, the electrodes 118 that are coupled to the third and fourth wall portions 106 and 108 are demonstrated in the example of FIG. 4 as being grounded. Therefore, the poling voltages $+V_{POL}$ and $-V_{POL}$ can pole the electro-optic material 116 to break the inversion symmetry of the electro-optic material 116, thus aligning the relevant non-inversion symmetric molecules. As a result, an electric field can be generated in each of the first and second output paths 112 and 114, demonstrated in the example of FIG. 4 as being directed in approximately the −Y direction with respect to a Cartesian coordinate system demonstrated at 152. As an example, the first and second poling voltages $+V_{POL}$ and $-V_{POL}$ can be applied at sufficiently high temperatures (e.g., several hundred degrees Celsius) and can have a magnitude that is sufficiently large to generate the electric field of a magnitude between approximately 100 and 200 V/μm. It is to be understood that, while the electro-optic material 116 is described herein as being "electro-optic", it is the poling of the electro-optic material 116 that induces the desired electro-optic effect in the material 116.

Figure 5:
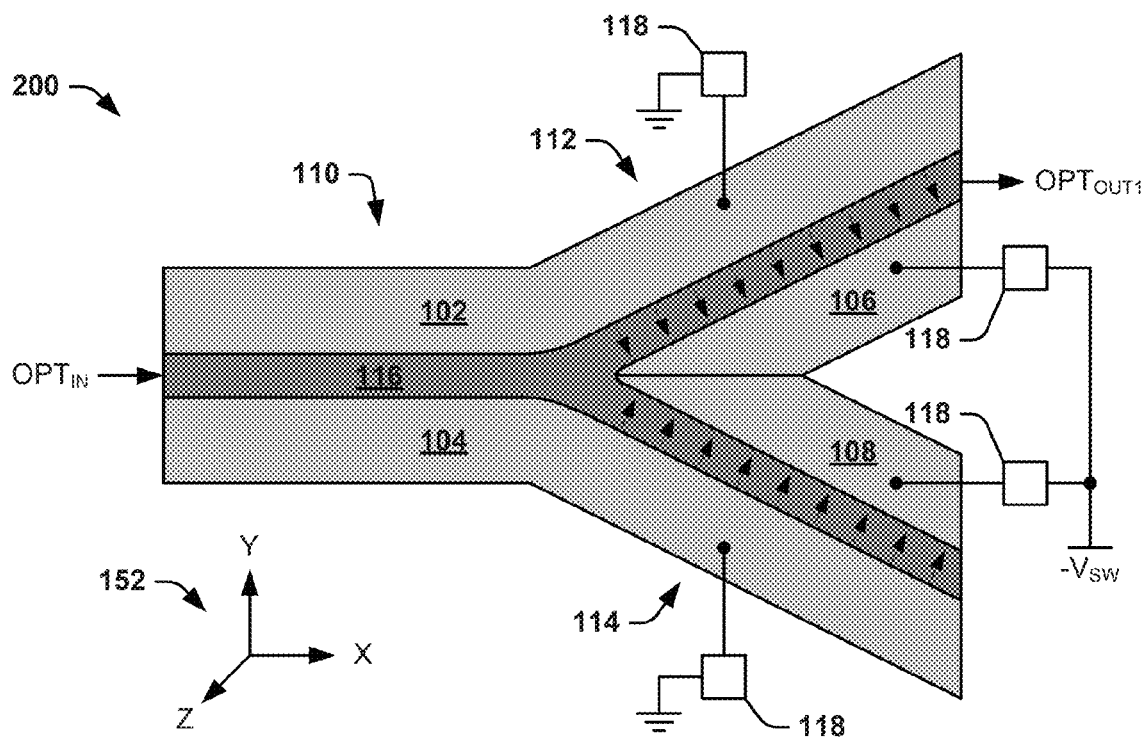
FIG. 5 illustrates an example diagram of a first switching state of the slot-line optical switch.

FIG. 5 illustrates an example diagram 200 of a first switching state of the slot-line optical switch 100. In the example of FIG. 5, the slot-line optical switch 100 is demonstrated in a normal operating condition, such as after the poling procedure demonstrated in the example of FIG. 4. The input optical signal $OPT_{IN}$ is demonstrated as being provided to the input channel 110, such as via a waveguide. In the example of FIG. 5, the electrodes 118 that are coupled to the first and second wall portions 102 and 104 are demonstrated as being coupled to ground, and the electrodes 118 that are coupled to the third and fourth wall portions 106 and 108 are demonstrated as being coupled to the negative polarity of the switching voltage $V_{SW}$ (i.e., $-V_{SW}$). The coupling of the electrodes to ground and to the negative switching voltage $-V_{SW}$ can be based on the channel switching system 22 controlled by the one or more switching signals SW. As a result, an electric field directed in approximately the −Y direction is generated in the first output path 112 and an electric field directed in approximately the +Y direction is generated in the second output path 114. Therefore, the refractive index of the electro-optic material 116 in the first output path 112 becomes greater than the refractive index of the electro-optic material 116 in the second output path 114. Accordingly, the input optical signal $OPT_{IN}$ propagates into the first output path 112 and exits the slot-line optical switch 100 as the first output optical signal $OPT_{OUT1}$.

Figure 6:
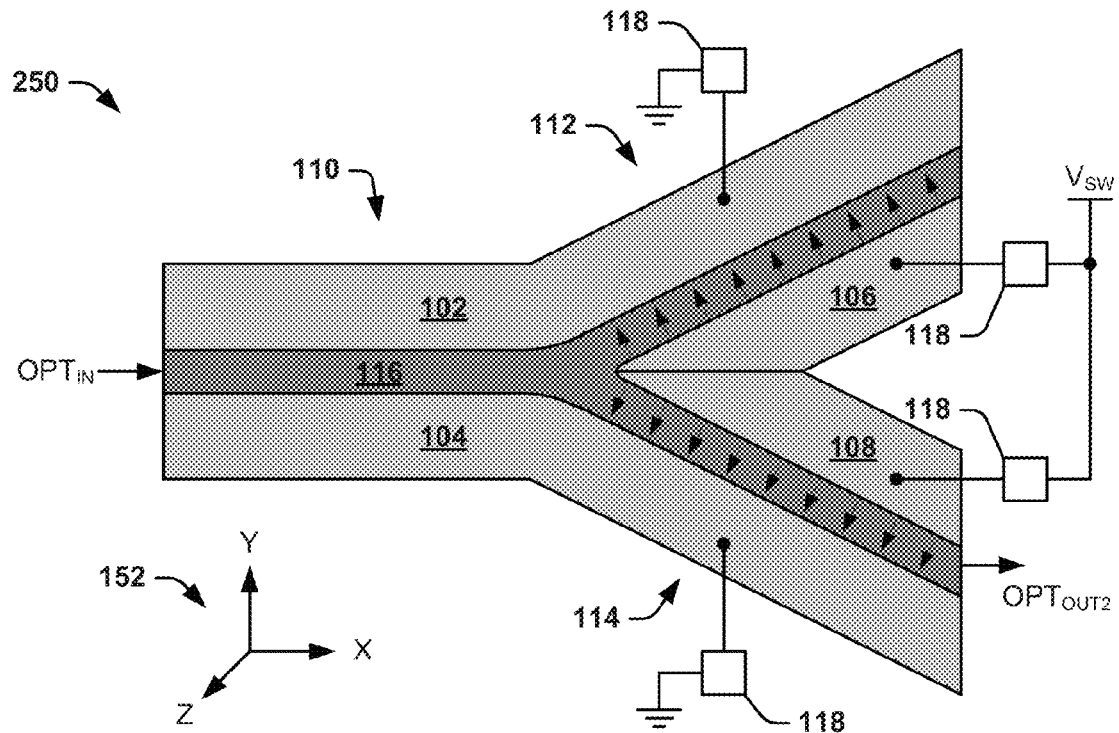
FIG. 6 illustrates an example diagram of a second switching state of the slot-line optical switch.

FIG. 6 illustrates an example diagram 250 of a second switching state of the slot-line optical switch 100. The second switching state demonstrated in the example of FIG. 6 is thus the opposite switching state from the first switching state demonstrated in the example of FIG. 5. In the example of FIG. 6, the electrodes 118 that are coupled to the first and second wall portions 102 and 104 are likewise coupled to ground. However, the electrodes 118 that are coupled to the third and fourth wall portions 106 and 108 are demonstrated as being coupled to the positive polarity of the switching voltage $V_{SW}$ (i.e., $+V_{SW}$). The coupling of the electrodes to ground and to the negative switching voltage $-V_{SW}$ can be based on the channel switching system 22 controlled by the one or more switching signals SW. As a result, an electric field directed in approximately the +Y direction is generated in the first output path 112 and an electric field directed in approximately the −Y direction (i.e., the poling field direction) is generated in the second output path 114. Therefore, the refractive index of the electro-optic material 116 in the second output path 114 becomes greater than the refractive index of the electro-optic material 116 in the first output path 112. Accordingly, the input optical signal $OPT_{IN}$ propagates into the second output path 112 and exits the slot-line optical switch 100 as the second output optical signal $OPT_{OUT2}$.

Figure 7:
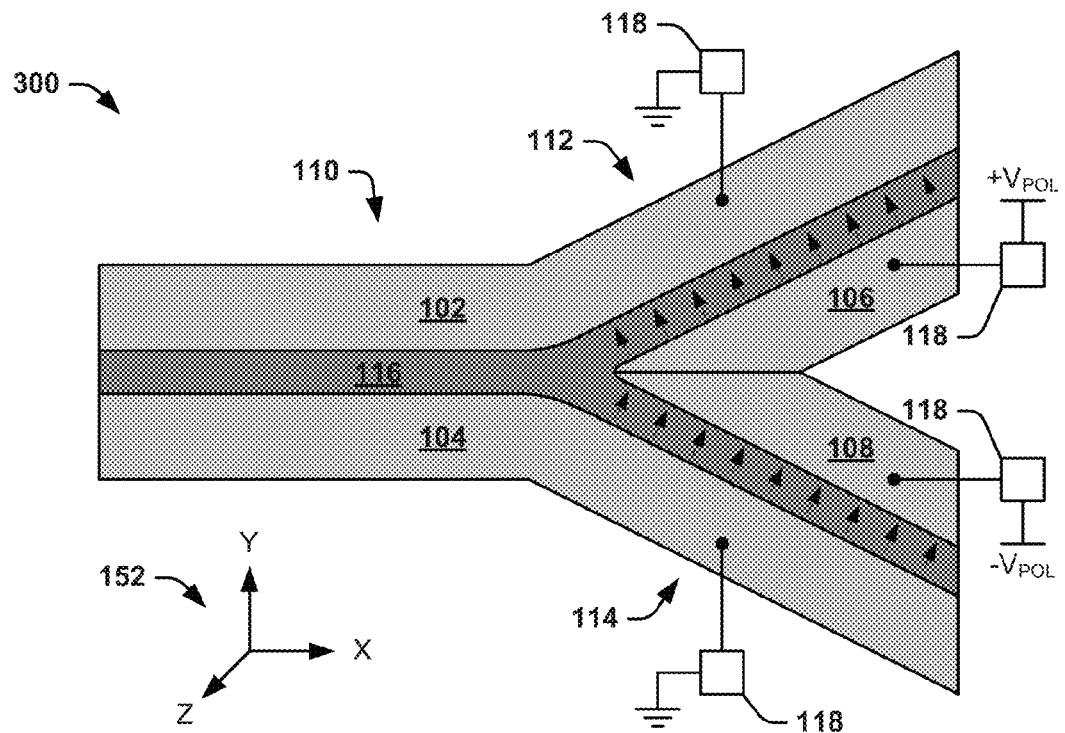
FIG. 7 illustrates another example diagram demonstrating poling of the slot-line optical switch.

FIG. 7 illustrates another example diagram 300 of poling of the slot-line optical switch 100. As an example, the diagram 300 can demonstrate an alternative approach that can be employed for poling the slot-line optical switch 100, for example, for an electro-optic material 116 that is formed from an organic polymer material. Alternatively, for an electro-optic material 116 that is formed from a chalcogenide material, the poling step demonstrated in the example of FIG. 7 can be omitted.

The diagram 300 demonstrates application of the first poling voltage $+V_{POL}$ to the electrode 118 coupled to the third wall portion 106 and application of the second poling voltage $-V_{POL}$ to the electrode 118 coupled to the fourth wall portion 108. In addition, the electrodes 118 that are coupled to the first and second wall portions 102 and 104 are demonstrated in the example of FIG. 7 as being grounded. Therefore, the poling voltages $+V_{POL}$ and $-V_{POL}$ can pole the electro-optic material 116 to break the inversion symmetry of the electro-optic material 116, thus aligning the relevant non-inversion symmetric molecules. As a result, an electric field can be generated in each of the first and second output paths 112 and 114, demonstrated in the example of FIG. 7 as directed in approximately the +Y direction. Similar to as described above regarding the example of FIG. 4, the first and second poling voltages $+V_{POL}$ and $-V_{POL}$ can be applied at sufficiently high temperatures (e.g., several hundred degrees Celsius) and can have a magnitude that is sufficiently large to generate the electric field of a magnitude between approximately 100 and 200 V/μm.

Figure 8:
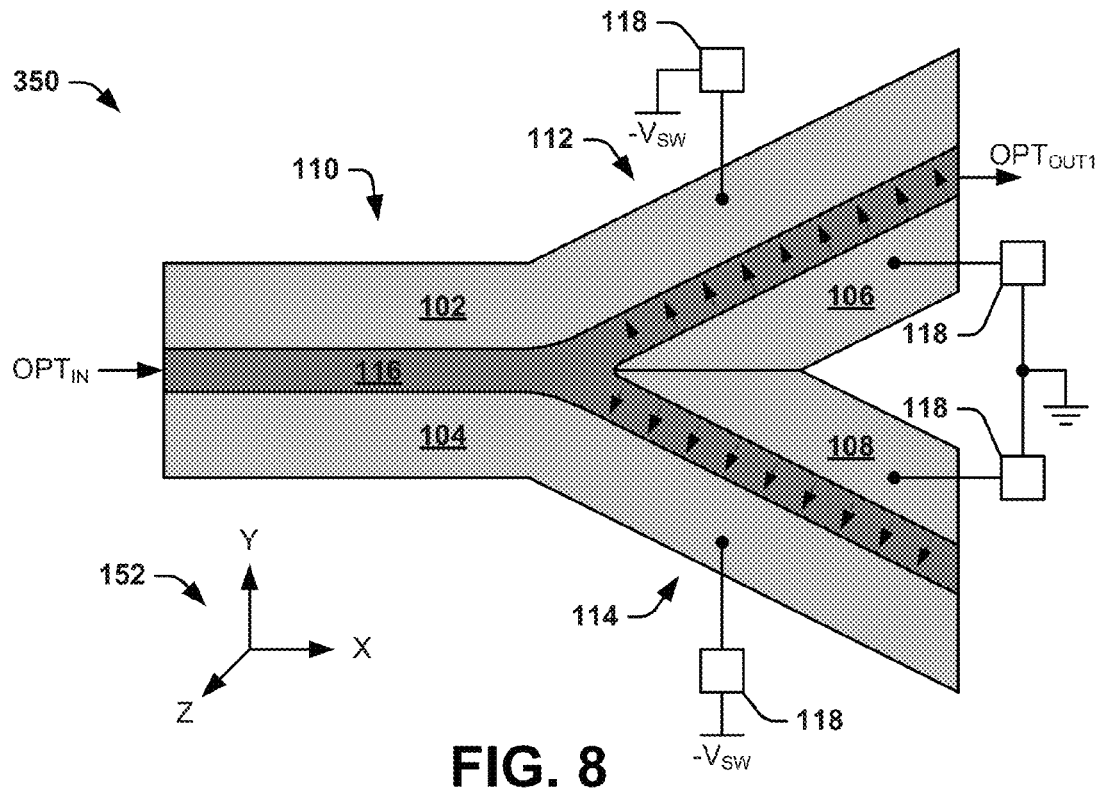
FIG. 8 illustrates another example diagram of a first switching state of the slot-line optical switch.

FIG. 8 illustrates another example diagram 350 of a first switching state of the slot-line optical switch 100. In the example of FIG. 8, the slot-line optical switch 100 is demonstrated in a normal operating condition, such as after the alternative poling procedure demonstrated in the example of FIG. 7. In the example of FIG. 8, the electrodes 118 that are coupled to the third and fourth wall portions 106 and 108 are demonstrated as being coupled to ground, and the electrodes 118 that are coupled to the first and second wall portions 102 and 104 are demonstrated as being coupled to the negative switching voltage $-V_{SW}$. As a result, an electric field directed in approximately the +Y direction (i.e., the poling field direction) is generated in the first output path 112 and an electric field directed in approximately the −Y direction is generated in the second output path 114. Therefore, the refractive index of the electro-optic material 116 in the first output path 112 becomes greater than the refractive index of the electro-optic material 116 in the second output path 114. Accordingly, the input optical signal $OPT_{IN}$ propagates into the first output path 112 and exits the slot-line optical switch 100 as the first output optical signal $OPT_{OUT1}$.

Figure 9:
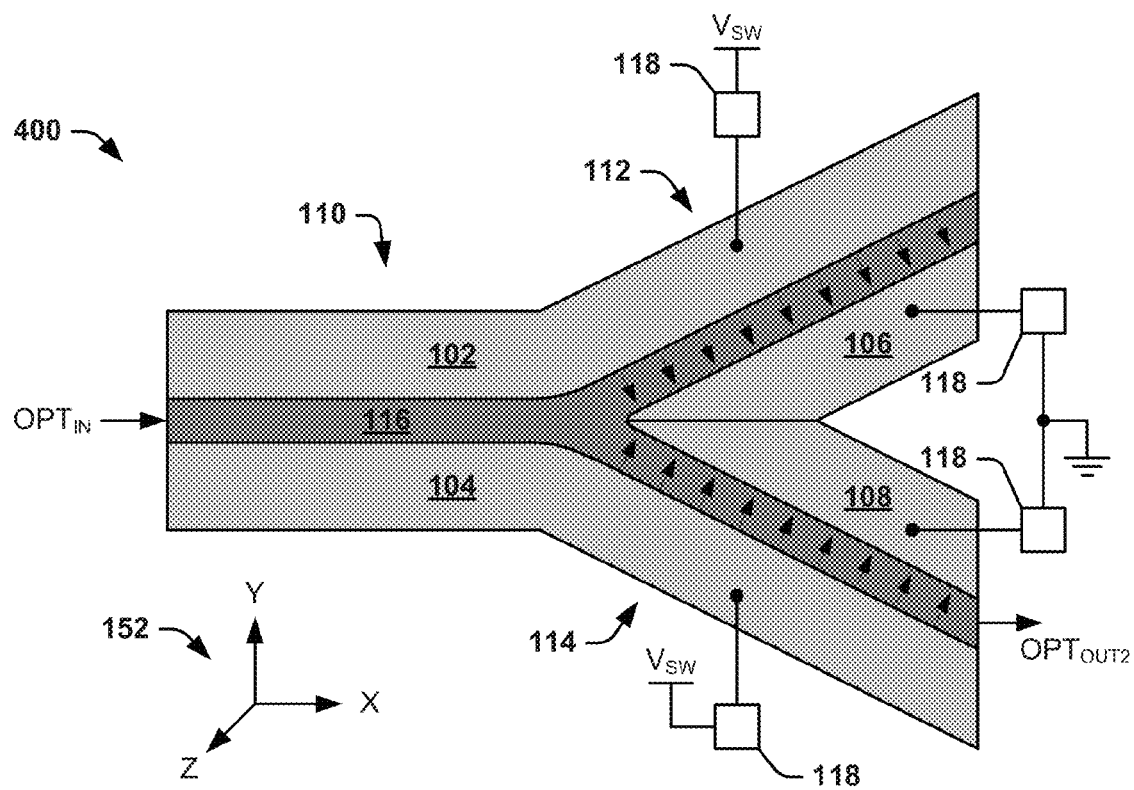
FIG. 9 illustrates another example diagram of a second switching state of the slot-line optical switch.

FIG. 9 illustrates another example diagram 400 of a second switching state of the slot-line optical switch 100. The second switching state demonstrated in the example of FIG. 8 is thus the opposite switching state from the first switching state demonstrated in the example of FIG. 8. In the example of FIG. 9, the electrodes 118 that are coupled to the third and fourth wall portions 106 and 108 are likewise coupled to ground. However, the electrodes 118 that are coupled to the first and second wall portions 102 and 104 are demonstrated as being coupled to the positive polarity of the switching voltage $V_{SW}$ (i.e., $+V_{SW}$). As a result, an electric field directed in approximately the −Y direction is generated in the first output path 112 and an electric field directed in approximately the +Y direction (i.e., the poling field direction) is generated in the second output path 114. Therefore, the refractive index of the electro-optic material 116 in the second output path 114 becomes greater than the refractive index of the electro-optic material 116 in the first output path 112. Accordingly, the input optical signal $OPT_{IN}$ propagates into the second output path 112 and exits the slot-line optical switch 100 as the second output optical signal $OPT_{OUT2}$.

Thus, the examples of FIGS. 3-9 demonstrate examples of a slot-line optical switch and how it can provide optical switching in an optical communications system. Because the switching of the input optical signal $OPT_{IN}$ to one of the first and second output channels 112 and 114 is implemented based on digital controls to change the refractive index of the electro-optic material 116, the slot-line optical switch 100 can be implemented for very high speed switching applications (e.g., much greater than 10 GHz). In addition, the slot-line optical switch 100 can consume very little power in switching states (e.g., much less than one pJ), and can consume no power in a quiescent state. Furthermore, based on the physical attributes of the slot-line optical switch 100, the slot-line optical switch 100 can be batch fabricated efficiently and with a very small footprint (e.g., less than one mm).

It is to be understood that the slot-line optical switch 100 and the diagrams 150, 200, 250, 300, 350, and 400 are not intended to be limited to the examples of FIGS. 3-9. For example, the slot-line optical switch 100 can be configured in a variety of ways. For example, the material concentration of the wall portions 102, 104, 106, and 108, as well as the electrodes 118, may be asymmetrical with respect to cross-sectional dimension of the slot-line waveguide, such as to substantially mitigate cross-talk. As another example, the high refractive-index material of the first and second wall portions 102 and 104 may be rendered substantially non-conductive at regions closer to the junction of the input channel 110 and the first and second output channels 112 and 114, or can be replaced by a non-conductive material, to substantially mitigate cross-talk. In addition, in the examples of FIGS. 4-6, it is to be understood that the slot-line optical switch 100 can be fabricated such that the third and fourth wall portions are integral, and thus electrically coupled. Furthermore, with respect to the poling and switching demonstrated in the respective examples of FIGS. 4-6 and 7-9, it is to be understood that a variety of other manners of poling the electro-optic material 116 and subsequently changing the refractive index of the electro-optic material 116 to switch the optical input signal $OPT_{IN}$ to one of the first and second output channels 112 and 114 can be implemented with the slot-line optical switch 100.

Figure 10:
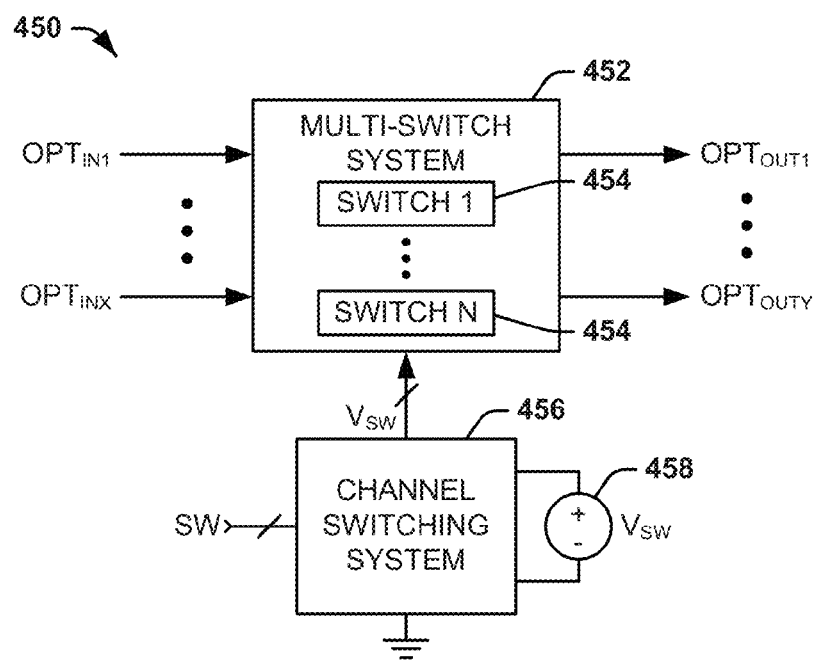
FIG. 10 illustrates another example of an optical switch system.

FIG. 10 illustrates another example of an optical switch system 450. The optical switch system 450 comprises a multi-switch system 452 that includes a plurality N of slot-line optical switches 454, where N is a positive integer greater than one. For example, the slot-line optical switches 454 can each be configured substantially similar to the slot-line optical switch 100 in the example of FIG. 3. As an example, the slot-line optical switches 454 can be coupled together, such as to couple the input channel of a given one of the slot-line optical switches 454 to one of the first and second output channels of another of the slot-line optical switches 454. For example, the slot-line optical switches 454 can be fabricated together as part of the same process, such that they form a monolithic multi-switch structure. Therefore, the multi-switch system 452 can be implemented in any of a variety of optical communications environments to rapidly switch one of X input optical signals $OPT_{IN1}$ through $OPT_{INX}$, where X is a positive integer, provided at an input channel of one of the slot-line optical switches 454 to one of a plurality Y of output optical signals $OPT_{OUT1}$ through $OPT_{OUTY}$, where Y is a positive integer greater than two, provided from an output channel of another of the slot-line optical switches 454.

Similar to as described in the examples of FIGS. 1 and 3, the slot-line optical switches 454 can each include one or more electrodes coupled to one or more of the wall portions that define the respective input channels and output channels. The optical switching system 450 includes a channel switching system 456 that is responsive to a set of switching signals SW to provide a switching voltage $V_{SW}$ generated by a voltage source 458 to the electrodes of the slot-line optical switches 454. As a result, the switching of the slot-line optical switches 454 can be performed individually to switch the one or more input optical signals $OPT_{IN1}$ through $OPT_{INX}$ to provide the one or more of the output optical signals $OPT_{OUT1}$ through $OPT_{OUTY}$, such as in a manner similar to as described above in the examples of FIGS. 4-6 and/or FIGS. 7-9.

Figure 11:
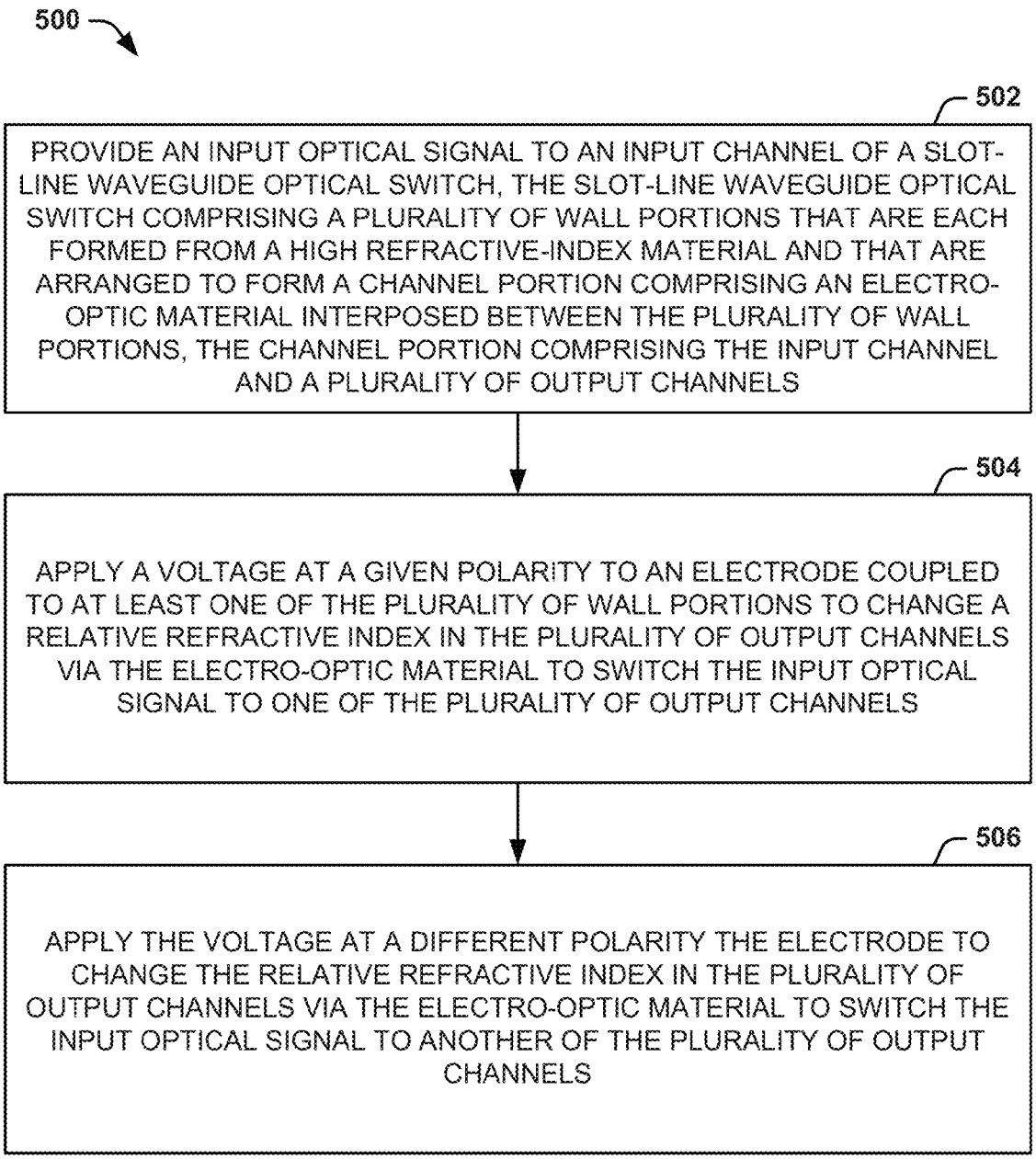
FIG. 11 is a flow diagram illustrating an example of a method for controlling a slot-line optical switch.

In view of the foregoing structural and functional features described above, an example method will be better appreciated with reference to FIG. 11. While, for purposes of simplicity of explanation, the method of FIG. 11 is shown and described as executing serially, it is to be understood and appreciated that the method is not limited by the illustrated order, as parts of the method could occur in different orders and/or concurrently from that shown and described herein.

FIG. 11 illustrates an example of a method 500 for controlling a slot-line optical switch. At 502, an input optical signal (e.g., the input optical signal $OPT_{IN}$) is provided to an input channel (e.g., the input channel 110) of a slot-line waveguide optical switch (e.g., the slot-line optical switch 100), the slot-line waveguide optical switch comprising a plurality of wall portions (e.g., the wall portions 102, 104, 106, and 108) that are each formed from a high refractive-index material and that are arranged to form a channel portion comprising an electro-optic material (e.g., the electro-optic material 116) interposed between the plurality of wall portions, the channel portion comprising the input channel, a plurality of output channels (e.g., the first output channel 112 and the second output channel 114).

At 504, a voltage (e.g., the switching voltage $V_{SW}$) is applied with a given polarity to an electrode (e.g., the electrodes 118) coupled to a corresponding one of the plurality of wall portions to change a relative refractive index in the plurality of output channels via the electro-optic material to switch the input optical signal to one of the plurality of output channels. At 506, the voltage is applied with a different polarity to the electrode to change the relative refractive index in the plurality of output channels via the electro-optic material to switch the input optical signal to another of the plurality of output channels.

What have been described above are examples. It is, of course, not possible to describe every conceivable combination of components or methodologies, but one of ordinary skill in the art will recognize that many further combinations and permutations are possible. Accordingly, the invention is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. An optical switch system comprising:
   a slot-line waveguide optical switch comprising a plurality of wall portions that are each formed from a high refractive-index material and that are arranged to form a channel portion comprising an electro-optic material interposed to extend between the plurality of wall portions, the channel portion comprising an input channel to receive an input optical signal and plural poled output channels to receive the input optical signal from the input channel, the poled output channels comprising poled electro-optic material; and
   a channel switching system to provide a voltage to an electrode coupled to a corresponding wall portion to change a poling field direction of one of the poled output channels via the electro-optic material and thereby switch the input optical signal to the respective one of the poled output channels.

2. The system of claim 1, wherein the plurality of wall portions comprises a first wall portion, a second wall portion, a third wall portion, and a fourth wall portion, the input channel being formed between the first and second wall portions, a first poled output channel being formed between the first and third wall portions, and a second poled output channel being formed between the second and fourth wall portions.

3. The system of claim 2, wherein the electrode comprises a first electrode coupled to the third wall portion and a second electrode coupled to the fourth wall portion, the first and second electrodes being substantially concurrently responsive to the voltage to change the poling field direction of the respective one of the first and second poled output channels via the electro-optic material and thereby switch the input optical signal to one of the first and second poled output channels.

4. The system of claim 3, wherein the first poled output channel and the second poled output channel have a predetermined electro-optic effect in response to respective poling voltages applied at the first and second electrodes, respectively.

5. The system of claim 2, wherein the electrode comprises a plurality of electrodes respectively coupled to the first and second wall portions, the plurality of electrodes being substantially concurrently responsive to the voltage to change the poling field direction in one of the first and second poled output channels via the electro-optic material to switch the input optical signal to the respective one of the first and second poled output channels.

6. The system of claim 2,
   wherein the electrode comprises a first electrode coupled to the third wall portion and a second electrode coupled to the fourth wall portion; and
   wherein the first and second poled output channels have a predetermined electro-optic effect in response to respective poling voltages applied at the first and second electrodes.

7. The system of claim 1, wherein the electro-optic material comprises a polymer having an electro-optic coefficient of at least 300 pm/V.

8. The system of claim 1, wherein the slot-line waveguide optical switch is a first slot-line waveguide optical switch, the optical switch system comprising a plurality of slot-line waveguide optical switches integrated together via a common substrate, the optical switching system being to switch the input optical signal provided at one of X input channels, where X is a positive integer, to one of Y poled output channels, where Y is a positive integer greater than two.

9. A method for controlling a slot-line optical switch system, the method comprising:
provinding an input optical signal to an input channel of a slot-line waveguide optical switch, the slot-line waveguide optical switch comprising a plurality of wall portions that are each formed from a high refractive-index material and that are arranged to form a channel portion comprising an electro-optic material interposed between the plurality of wall portions, the channel portion comprising the input channel and a plurality of output channels comprising poled electro-optic material;
applying a voltage with a given polarity to an electrode coupled to a corresponding one of the plurality of wall portions to change a poling field direction in the plurality of output channels via the electro-optic material to switch the input optical signal to one of the plurality of output channels; and
applying the voltage with a different polarity to the electrode to change the poling field direction in the plurality of output channels via the electro-optic material to switch the input optical signal to another of the plurality of output channels.

10. The method of claim 9, wherein applying the voltage to the electrode comprises applying the voltage to a first electrode coupled to a first wall portion and to a second electrode coupled to a second wall portion substantially concurrently and with the given polarity to switch the input optical signal to the one of the plurality of output channels and at the second polarity to switch the input optical signal to the other of the plurality of output channels;
wherein the first wall portion and the third wall portion form the one of the plurality of output channels, the second wall portion and a fourth wall portion form the other of the plurality of output channels, and the third wall portion and the fourth wall portion form the input channel.

11. The method of claim 9, wherein applying the voltage to the electrode comprises applying the voltage to a first electrode coupled to a first wall portion and a second electrode coupled to a second wall portion substantially concurrently at the given polarity to switch the input optical signal to the one of the plurality of output channels and at the different polarity to switch the input optical signal to the other of the plurality of output channels;
wherein the first wall portion and the second wall portion form the input channel, the first wall portion and a third wall portion form the one of the plurality of output channels, and the second wall portion and a fourth wall portion form the other of the plurality of output channels.

* * * * *